United States Patent
Peng et al.

(10) Patent No.: US 6,720,978 B2
(45) Date of Patent: *Apr. 13, 2004

(54) METHOD FOR STORING AND RETRIEVING DATA THAT CONSERVES MEMORY BANDWIDTH

(75) Inventors: Sharon Peng, Yorktown Heights, NY (US); Mihaela Van Der Schaar, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/278,285

(22) Filed: Oct. 23, 2002

(65) Prior Publication Data

US 2003/0038809 A1 Feb. 27, 2003

Related U.S. Application Data

(63) Continuation of application No. 09/411,461, filed on Oct. 1, 1999.

(51) Int. Cl.$^7$ ................................................. G09G 5/00
(52) U.S. Cl. .................... 345/658; 345/649; 345/674
(58) Field of Search ............................... 345/658, 649, 345/674

(56) References Cited

U.S. PATENT DOCUMENTS

| | | | |
|---|---|---|---|
| 4,052,699 A | * 10/1977 | Micka et al. | 382/297 |
| 4,627,020 A | * 12/1986 | Anderson et al. | 382/297 |
| 4,989,092 A | * 1/1991 | Doyle et al. | 348/448 |
| 5,670,982 A | * 9/1997 | Zhao | 345/658 |
| 5,712,995 A | * 1/1998 | Cohn | 345/792 |
| 5,790,712 A | * 8/1998 | Fandrianto et al. | 382/276 |

* cited by examiner

Primary Examiner—Matthew C. Bella
Assistant Examiner—Mackly Monestime

(57) ABSTRACT

A method for storing a block of data consisting of N rows and M columns, which includes the step of transposing the block of data by 90° to thereby produce a transposed block of data consisting of M rows and N columns, and, the step of storing the transposed block of data. The transposed block of data is preferably retrieved by using one or more fetch commands, with the number of fetch commands required to retrieve the transposed block of data being less than the number of fetch commands required to retrieve the same data if stored in its original form, thereby reducing memory bandwidth. In a presently contemplated implementation, the block of data is a reference macroblock of decoded MPEG video data that is used in motion compensation operations, and each of the fetch commands is an A×B fetch command, where A represents the number of columns of data and B represents the number of rows of data to be fetched in response thereto, and wherein further, A>B.

13 Claims, 3 Drawing Sheets

METHOD FOR STORING AND RETRIEVING DATA THAT CONSERVES MEMORY BANDWIDTH

CROSS REFERENCE TO RELATED APPLICATIONS

This is a continuation of application Ser. No. 09/411,461, filed Oct. 1, 1999.

BACKGROUND OF THE INVENTION

The present invention relates generally to memory management, and, more particularly, to a method for storing and retrieving data that conserves memory bandwidth.

Recent dramatic technological advancements in the fields of computers, semiconductors, and communications have led to a proliferation of products that are capable of real-time processing of digitized streams of multiple data types, such as audio, video, graphics, and communications data streams. Such products are commonly referred to as "multimedia products". These multimedia products include multimedia personal computers (PCs), television set-top boxes, video-conferencing systems, High Definition Television (HDTV) sets, video telephony systems, Internet (Web) browsers, video arcade game systems, consumer video game consoles, and many others.

High-quality multimedia applications require enormous amounts of processing power, memory resources, and communications bandwidth, which requirements are continuously increasing due to the increasing variety and complexity of the multimedia data being processed. For example, many multimedia products must be capable of simultaneous, real-time processing of photorealistic 3-D graphics, CD-quality digital audio, full-motion digital video (e.g., MPEG-encoded video), and communications data streams. Until recently, each of these multimedia processing functions was handled by a separate, dedicated processor element. Typically, a separate, programmable Digital Signal Processor (DSP) is used to handle each multimedia data type, with each DSP functioning as a co-processor in conjunction with a host CPU. However, Philips Semiconductors' TriMedia Product Group has developed a new Very Long Instruction Word (VLIW) processor architecture for consumer multimedia applications that converges these different functions into a single multi-function processor, called the TriMedia processor. The TM-2000 processor, which is the latest version of the TriMedia processor, is a programmable DSP/CPU that combines a next-generation, programmable microprocessor core with a full set of innovative development tools to simultaneously process full-motion video (i.e., MPEG-2 digital video and DVD video), 3-D graphics, and CD-quality audio, and high-speed communications data streams. By combining these various functions on a single chip, which reduces cost, size and power demands, the TM-2000 processor makes possible the implementation of an advanced multimedia system at an affordable cost and with a smaller footprint. This implementation of multiple processing functions on a single chip is sometimes referred to as a "system-on-a-chip".

With reference now to FIG. 1, there can be seen a high-level block diagram of the TM-2000 processor 20. As can be readily seen, the TM-2000 processor 20 includes a VLIW CPU 22 supported by a dedicated on-chip data cache 23 and a separate, dedicated on-chip instruction cache 24. The TM-2000 processor 20 also includes a plurality of on-chip, independent, DMA-driven multimedia I/O and coprocessing units 50a–50j that will hereinafter referred to as "function units". These on-chip function units 50a–50j manage input, output, and formatting of video, audio, graphics, and communications datastreams and perform operations specific to key multimedia algorithms, thereby streamlining and accelerating the processing of these video, audio, graphics, and communications datastreams.

With continuing reference to FIG. 1, the TM-2000 processor 20 utilizes an external Synchronous Dynamic Random Access Memory (SDRAM) 30 (or, a Sychronous Graphics Random Access Memory (SGRAM)) that is shared by the function units 50a–50j via a high-speed internal 32-bit bus 40a, and a 64-bit bus 40b. The 32-bit bus 40a connects to a main memory interface 41 through a bridge 43. The 32-bit bus 40a and the 64-bit bus 40b will hereinafter be collectively referred to as the "data highway 40". Bus transactions use a block transfer protocol. The on-chip function units 50a–50j can be masters or slaves on the data highway 40. Programmable bandwidth allocation enables the data highway 40 to maintain real-time responsiveness in a variety of different applications.

Because the SDRAM 30 is a shared memory resource that is frequently accessed by the multiple function units 50a–50j of the processor 20 via the data highway 40, the two-way data traffic on the data highway 40 requires a large amount of memory bandwidth. Memory bandwidth is defined as the maximum rate (e.g., Mbytes/second) at which the data can be transferred between the SDRAM 30 and the function units 50a–50j and the CPU 22 of the processor 20. It is highly advantageous to minimize the amount or proportion of the overall memory bandwidth for the processor 20 that is consumed by any given one of the function units 50a–50j and the CPU 22 within the processor 20, in order to thereby improve the efficiency, speed, and overall performance of the processor 20. In a worst case scenario, if the memory bandwidth is insufficient, bottlenecks can occur due to data traffic congestion on the data highway 40, thereby resulting in improper operation of the system and/or system failure.

The processing of digital video datastreams is a function that consumes a large amount of the available memory bandwidth, due to the fact that this function requires extensive use of memory in order to execute the complex algorithms that are required to decode and process the digital video datastreams. For example, the decoding and processing of MPEG-2 encoded digital video datastreams requires many memory-intensive operations to be performed. In the context of the TM-2000 processor 20 depicted in FIG. 1, the function unit 50a, called "MPEG2 Coprocessor", is responsible for decoding the MPEG-2 encoded digital video datastream received by the function unit 50b, called "Vin/TS-In2", hereinafter referred to simply as "Video In". The decoded digital video data is stored in the SDRAM 30, and then the function unit 50c, called "HD-VO" (High Definition-Video Out), hereinafter referred to simply as "Video Out", fetches the decoded digital video data, performs any required post-processing operations, and then outputs the decoded digital video data to a display device. One particularly memory-intensive operation that is required by the MPEG-2 decoding function is Motion Compensation (MC), due to the fact that it entails block-based processing on randomly distributed reference blocks of the digital video data stored in the SDRAM 30, which demands frequent and random memory accesses.

Based on the above and other factors, and as will be appreciated by those skilled in the pertinent art, the function unit 50a (hereinafter referred to simply as the "MPEG-2 decoder") consumes a considerable amount of the available memory bandwidth in the TM-2000 processor 20. Thus, in designing future generations of this TriMedia processor family the amount of the memory bandwidth required by this function unit should be minimized. The present invention meets this design objective by providing a novel methodology for storing data in and fetching data from a memory. Moreover, as will become readily apparent to a person skilled in the pertinent art, the methodology of the present invention has utility in any device or system that could benefit therefrom, the TriMedia processor being discussed herein by way of example only. In general, the present invention has utility in any system that includes a memory that is accessed in a manner that requires a first memory bandwidth if the data is stored and retrieved in the conventional way, but only requires a second memory bandwidth that is less than the first memory bandwidth if the data is stored and retrieved in accordance with the methodology of the present invention.

SUMMARY OF THE INVENTION

The present invention encompasses, in one of its aspects, a method for storing a block of data consisting of N rows and M columns, which includes the step of transposing the block of data by 90° to thereby produce a transposed block of data consisting of M rows and N columns, and, the step of storing the transposed block of data. The transposed block of data is preferably retrieved by using one or more fetch commands, with the number of fetch commands required to retrieve the transposed block of data being less than the number of fetch commands required to retrieve the same data if stored in its original form. In a presently contemplated implementation, the block of data is a reference macroblock of decoded MPEG video data that is used in motion compensation operations, and each of the fetch commands is an A×B fetch command, where A represents the number of columns of data and B represents the number of rows of data to be fetched in response thereto, and wherein further, A>B.

The present invention encompasses, in another of its aspects, a processor that implements the above-described method. In a presently contemplated implementation, the processor is a multimedia processor that includes a number of function units that are commonly coupled to a system bus that is coupled to a memory (e.g., an SDRAM) in which the transposed data is stored.

BRIEF DESCRIPTION OF THE DRAWINGS

These and other objects, features, and advantages of the present invention will become readily apparent from the following detailed description read in conjunction with the accompanying drawings, in which.

DETAILED DESCRIPTION OF THE INVENTION

In overview, the present invention is directed to a novel method of storing data in a memory which, for example, can be utilized in conjunction with certain data processing functions or operations to conserve memory bandwidth. In particular, in accordance with the novel method of the present invention, a block of data consisting of N rows and M columns, is first rotated or transposed by 90° to thereby produce a transposed block of data consisting of M rows and N columns. The transposed block of data is then stored in the memory. In further accordance with the novel method of the present invention, the transposed block of data is then fetched, and then inversely transposed to thereby produce the original block of data. As previously discussed herein, the methodology of the present invention can be utilized in any device, system, or application that stands to benefit therefrom. Thus, although the present invention is described below in connection with a proposed future generation of the TriMedia processor, which constitutes the presently contemplated implementation of this invention, it should be clearly understood that the present invention is not limited to this or any other application. For example, it is believed that this methodology would have utility in any application in which data is processed in blocks, with the data blocks being stored and fetched in a manner that makes inefficient use of the available memory bandwidth (such as block-based video processing algorithms, e.g., MPEG-1, MPEG-2, MPEG-4, H.263, and the like; video enhancement operations such as deinterlacing and 100 Hz conversion, and the like).

By way of background, it should be understood that many solutions have been proposed to minimize the amount of memory (i.e., the memory resources) required to implement digital video processing and coding algorithms, particularly in the context of consumer products, such as HDTV sets and set-top converter boxes, which must perform MPEG-2 decoding and other post-processing functions in a highly cost-effective manner. The most widely-adopted memory reduction scheme for MPEG-2 decoders is down-scaling the decoded frames of digital video data prior to storage in the memory. Because the video data to be decoded is mostly interlaced, downscaling the video data only horizontally is the optimum solution with regard to preservation of image quality.

Figure 1:
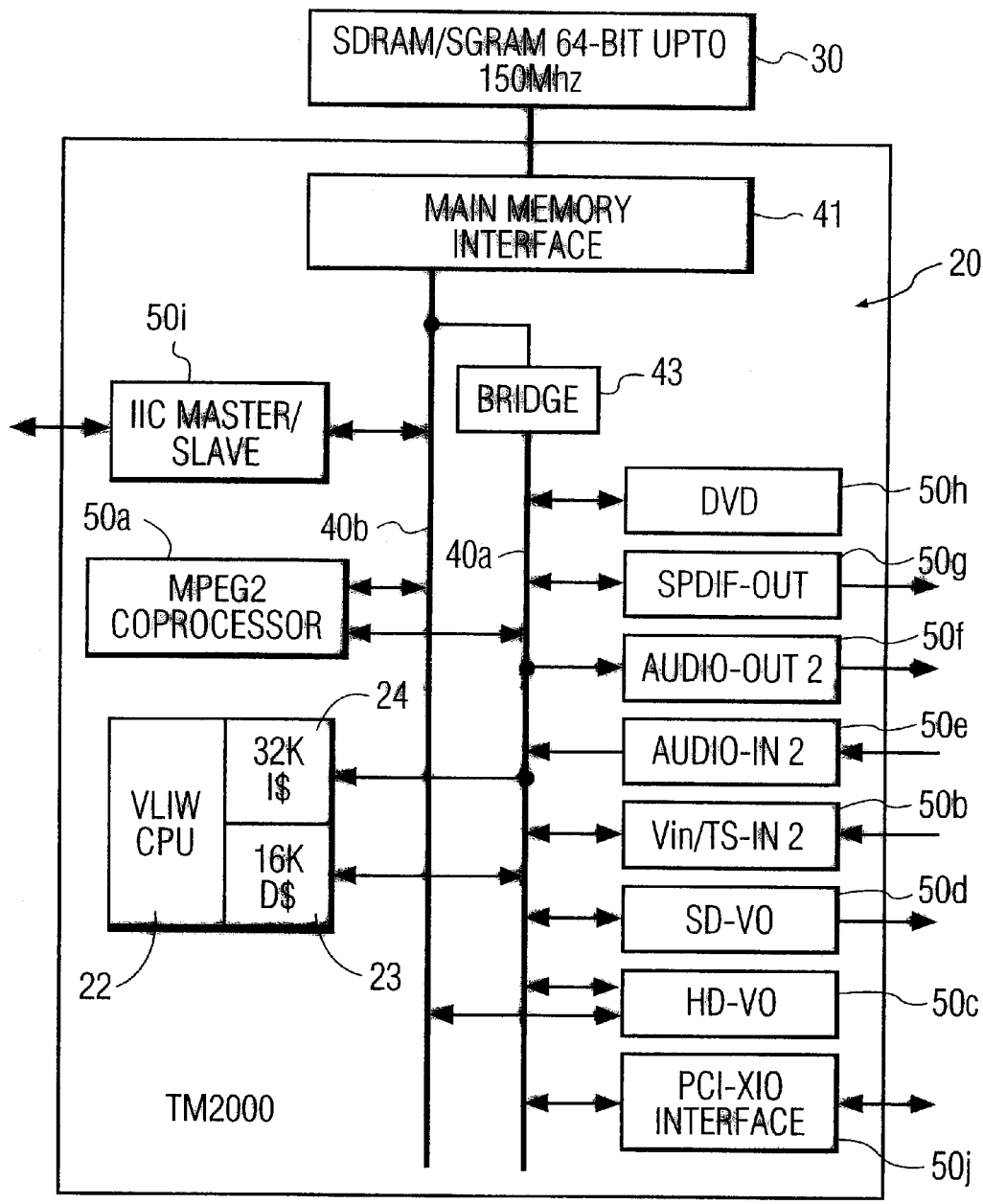
FIG. 1 is a functional block diagram of a TriMedia TM-2000 processor.
Figure 2A:
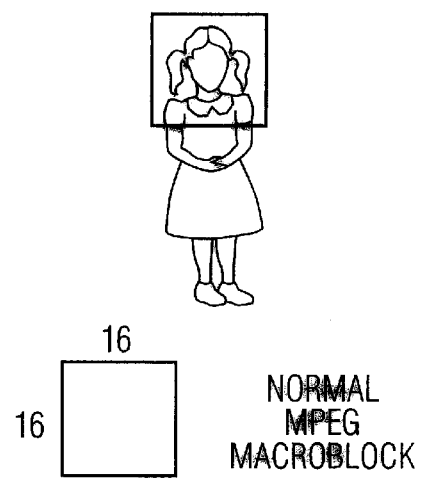
FIGS. 2a and 2b illustrate, respectively, a normal MPEG macroblock, and a horizontally down-scaled (by a factor of 2) version of the same MPEG macroblock.
Figure 2B:
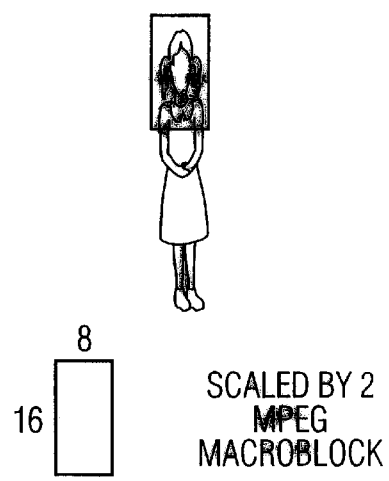

However, reducing the amount of data that is required to be stored in the memory does not automatically result in a decrease in the required memory bandwidth. This is due to some intrinsic properties of the memory, e.g., SDRAM, employed, which dictate how the data is written into and read out of the memory. In general, current technology stores each horizontal line of an image row-by-row into the memory. In this way, the organization of the video data in the memory corresponds to the physical orientation of the display. For this reason, the video data is commonly referred to as a "bit map" of the display. It will be readily appreciated that if the video data is down-scaled (compressed) in the horizontal direction, thereby reducing the number of columns occupied by the video data, the number of rows occupied by the video data will not change. For example, if the decoded video data is compressed horizontally with a compression ratio of 2, then assuming that the video data originally consists of 16×6 macroblocks, then the compressed video data will consist of 8×16 macroblocks, as is illustrated in FIGS. 2a and 2b. Obviously, the amount of memory required to store the compressed video data is half of the amount of memory that would have been required to store the uncompressed video data.

However, reducing the amount of memory required to store the data does not necessarily result in a commensurate reduction in the required memory bandwidth. For example, if the data is fetched from the memory in a manner that results in a fixed number of columns and a fixed number of rows of data being fetched with a single fetch command, then compressing (e.g., down-scaling) the number of columns of blocks of data does not result in a reduction in memory bandwidth that is required to execute that fetch command, since only a fixed number of columns are fetched with a single fetch command.

Due to intrinsic characteristics of semiconductor memories, such as SDRAMs, the time required to access consecutive chunks of data stored in the same row of the memory is much less than the time required to access consecutive chunks of data stored in consecutive rows of the memory. The method of the present invention exploits this intrinsic characteristic of SDRAMs (and other types of semiconductor memories) by transposing (rotating) a block of data consisting of N rows and M columns by 90°, to thereby produce a transposed block of data consisting of M rows and N columns. Thus, where N>M, the bandwidth required to fetch the transposed block of data is less than the bandwidth required to fetch the same block of data without transposing it, since, after transposition, there are fewer rows of data (although a greater number of columns of data) that need to be fetched with this scheme. In particular, if A×B fetch commands (where A>B) are used to fetch the data, fewer such fetch commands will be required to fetch a transposed block of data than would be required to fetch the same block of data if it weren't transposed. Several examples of the method of the present invention are described below in order to illustrate the memory bandwidth reduction that can be achieved using the methodology of the present invention. These examples relate to a presently contemplated implementation of the present invention in connection with proposed future generations of the TriMedia family of processors.

Presently proposed future generations of the TriMedia family of processors adopt 16×4/16×5 and 24×4/24×5 fetch commands in addition to a linear fetch command for reading data from the external memory (e.g., SDRAM), in order to conserve memory bandwidth. However, as will become apparent hereinafter, when performing certain operations, such as MPEG-2 motion compensation, the amount of memory bandwidth conserved by use of these fetch commands can be greatly increased by utilizing the method of the present invention. In this regard, the method of the present invention will be described below in connection with the operations of writing (storing) and reading (fetching) macroblock data for MPEG-2 motion compensation.

Figure 3:
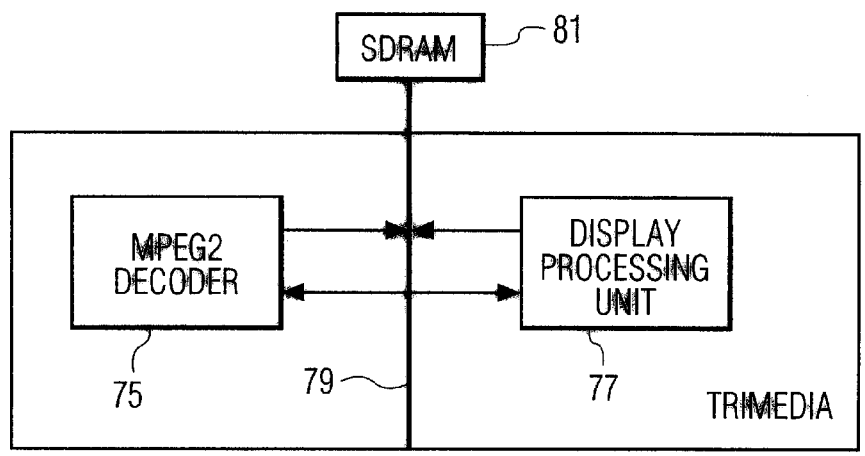
FIG. 3 is a functional block diagram of the components of a TriMedia processor that are relevant to an understanding of the present invention.

FIG. 3 depicts the components of the TriMedia processor that are relevant to an understanding of the present invention, namely, the MPEG-2 decoder 75, the Display Processing Unit 77, the system bus (data highway) 79, and the external memory (SDRAM) 81. In operation, the MPEG-2 decoder 75 decompresses (decodes) the incoming video bitstream and writes the decoded video data into the SDRAM 81. The decoded video data is then subsequently read out of (fetched from) the SDRAM 81, for two purposes, namely, (a) the MPEG-2 fetches reference macroblocks of the stored video data for motion compensation, and (b) the Display Processing Unit 77 fetches the video data for post-processing and/or display. Because the memory bandwidth required by the MPEG-2 decoder 75 to fetch randomly located reference macroblocks for motion compensation operations is far greater than that required by the Display Processing Unit 77 to fetch the video data for post-processing operations and/or display, the discussion of the present invention will be focused on the former.

For ease of illustration, it will be assumed that the macroblock size is 17×17 (half-pel precision), although it should be clearly understood that the invention is not limited thereto, e.g., it is likewise applicable to a macroblock size of 16×16. In the case of 17×17 macroblocks, the 24×4/24×5 fetch commands are used to fetch the reference macroblocks from the SDRAM 81. As will be readily appreciated, three 24×4 and one 24×5 fetch commands are required to fetch a single 17×17 macroblock.

If the decoded video data is horizontally down-scaled by a factor of 2 prior to its being stored in the SDRAM 81, then the amount of memory required to store the decoded video data will be commensurately reduced (i.e., by a factor of 2). The memory bandwidth required to write this decoded video data into the SDRAM 81 and to read this decoded video data out of the SDRAM 81 to the Display Processing Unit 77 will also be reduced by a factor of 2 (i.e., the required memory bandwidth will be halved). However, the memory bandwidth required to read reference macroblocks of the decoded video data from the SDRAM 81 will not be commensurately reduced, as illustrated below.

Figure 4:
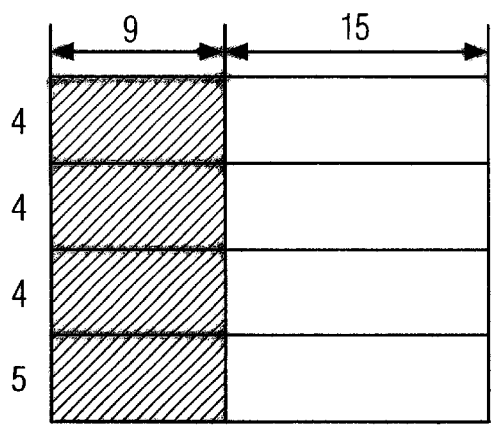
FIG. 4 is a diagram that depicts the results of a fetch of a 9×17 reference macroblock that constitutes a horizontally down-scaled (by a factor of 2) original 17×17 reference macroblock, using the conventional approach; and, FIG. 5 is a diagram that depicts the results of the fetch of a 9×17 reference macroblock that constitutes a horizontally down-scaled (by a factor of 2) original 17×17 reference macroblock, using the method of the present invention.

With 2:1 horizontal down-scaling, a 17×17 original macroblock is reduced to a 9×17 macroblock. To fetch a 9×17 macroblock, three 24×4 and one 24×5 fetch commands are needed, as illustrated in FIG. 4, in which the shaded area represents the data needed for motion compensation, and the unshaded area represents the unnecessary data (i.e., overhead data). As can readily be seen, in this case, using the conventional methodology for storing and retreiving the data, 408 bytes of data (i.e., (3×24×4)+(24×5)) must be fetched in order to retrieve a 9×17 macroblock, i.e., 153 useful bytes of data, thus resulting in retrieval of 255 unncessary bytes of data. A useful metric for quantifying this waste of memory bandwidth is the ratio of unnecessary bytes/useful bytes of data resulting from the fetch sequence, i.e., in this case, 255/153=167%. This metric will be hereinafter referred to as "memory bandwidth overhead ratio".

Figure 2C:
FIG. 2c illustrates the same horizontally down-scaled MPEG macroblock depicted in FIG. 2b, after it is transposed 90° in accordance with the method of the present invention.
Figure 5:
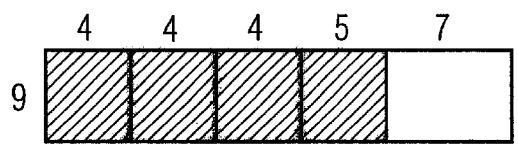

However, with the method of the present invention, the memory bandwidth overhead ratio for the above fetch sequence can be reduced from 167% to 41%. In particular, by rotating the 9×17 macroblock by 90°, the original 9×17 macroblock becomes a 17×9 macroblock, i.e., the columns of the transposed macroblock correspond to the rows of the original macroblock, and the rows of the transposed macroblock correspond to the columns of the original macroblock, as is illustrated in FIGS. 5 and 2c. In this case, to fetch a 17×9 macroblock, only one 24×4 and one 24×5 fetch commands are needed. As can be readily seen, in this case, the memory bandwidth overhead ratio is ((24×4)+(24×5)−(17×9))/(17×9)=41%. In particular, only 216 bytes of data ((24×4)+(24×5)) must be fetched in order to retrieve a 9×17 macroblock, i.e., 153 useful bytes of data, thus resulting in retrieval of 63 unncessary bytes of data. The net result is that the memory bandwidth required to retrieve the original 9×17 macroblock using the methodology of the present invention is almost half of that required to retrieve the original 9×17 macroblock using the conventional methodology.

It will be readily appreciated that the method of the present invention can be implemented in the memory interface, without any required modification to the memory infrastructure itself. The method of the present invention may require extra lines of memory in the decoder itself because all rows of the transposed macroblock will need to be fetched in order to reconstruct one "real" row of the original (non-transposed) macroblock. However, any additional memory required locally at the decoder is a minor drawback in comparison to the dramatic reduction in memory bandwidth that can be achieved with the method of the present invention.

Although the present invention has been described in detail hereinabove, it should be appreciated that many variations and/or modifications of the basic inventive concepts taught herein which may appear to those skilled in the pertinent art will still fall within the spirit and scope of the present invention as defined in the appended claims.

To reiterate, although the present invention has been described above in connection with a proposed future generation of the TriMedia processor, which constitutes the presently contemplated implementation of this invention, it should be clearly understood that the present invention is not limited to this or any other application. For example, it is believed that this methodology would have utility in any application in which data is processed in blocks, with the data blocks being stored and fetched in a manner that makes inefficient use of the available memory bandwidth (such as block-based video processing algorithms, e.g., MPEG-1, MPEG-2, MPEG-4, H.263, and the like; video enhancement operations such as deinterlacing and 100 Hz conversion, and the like).

What is claimed is:

1. A method for storing a block of data comprised of N rows and M columns, comprising:

transposing the block of data by 90° to thereby produce a transposed block of data comprised of M rows and N columns, where N>M; and storing the transposed block of data; and retrieving the transposed block of data using one or more fetch commands, with the number of fetch commands required to retrieve the transposed block of data being less than the number of fetch commands required to retrieve the same data if stored in its original form.

2. The method as set forth in claim 1, wherein the block of data comprises a block of video data.

3. The method as set forth in claim 1, wherein the block of data comprises a block of decoded MPEG video data.

4. The method as set forth in claim 1, wherein each of the fetch commands is an A×B fetch command, where A represents the number of columns of data and B represents the number of rows of data to be fetched in response thereto, and wherein further, A>B.

5. The method as set forth in claim 1, wherein the method is implemented in a video processor in connection with motion compensation operations.

6. A processor that implements the method set forth in claim 1.

7. The processor as set forth in claim 6, wherein:

the processor is a multimedia processor that includes a number of function units that are commonly coupled to a system bus that is coupled to a memory; and, the transposed block of data is stored in the memory.

8. A method for storing data originally formatted to include N rows and M columns, comprising:

transposing the data by 90° to thereby produce transposed data formatted to include M rows and N columns, where N>M, the data comprising decoded MPEG video data that is comprised of a plurality of macroblocks, which are stored as transposed macroblocks;

storing the transposed data; and retrieving a selected one of the transposed macroblocks to be used as a reference macroblock in a motion compensation operation, the retrieving being performed using one or more fetch commands, with the number of fetch commands required to retrieve the transposed macroblock of data being less than the number of fetch commands required to retrieve the same macroblock of data if stored in its original form.

9. The method as set forth in claim 8, wherein each of the fetch commands is an A×B fetch command, where A represents the number of columns of data and B represents the number of rows of data to be fetched in response thereto, and wherein further, A>B.

10. The method as set forth in claim 8, wherein the method is implemented in a video processor in connection with motion compensation operations.

11. A processor that implements the method set forth in claim 8.

12. The processor as set forth in claim 11, wherein:

the processor is a multimedia processor that includes a number of function units that are commonly coupled to a system bus that is coupled to a memory; and, the transposed data is stored in the memory.

13. The processor as set forth in claim 12, wherein the memory comprises an SDRAM.

* * * * *